United States Patent
De Koomen

(10) Patent No.: US 11,272,723 B2
(45) Date of Patent: Mar. 15, 2022

(54) METHOD OF AND SYSTEM FOR SURFACE PASTEURIZATION OR STERILIZATION OF LOW-MOISTURE PARTICULATE FOODS

(71) Applicant: Royal Duyvis Wiener B.V., Koog aan de Zaan (NL)

(72) Inventor: Joost Jan De Koomen, Phoenix, MD (US)

(73) Assignee: ROYAL DUYVIS WIENER B.V., Koog aan de Zaan (NL)

( * ) Notice: Subject to any disclaimer, the term of this patent is extended or adjusted under 35 U.S.C. 154(b) by 0 days.

(21) Appl. No.: 14/491,099

(22) Filed: Sep. 19, 2014

(65) Prior Publication Data

US 2015/0024101 A1    Jan. 22, 2015

Related U.S. Application Data

(63) Continuation of application No. PCT/EP2013/060277, filed on May 17, 2013, which
(Continued)

(30) Foreign Application Priority Data

Sep. 12, 2012  (EP) .................................... 12184020

(51) Int. Cl.
*A23L 3/3418* (2006.01)
*A23B 9/02* (2006.01)
(Continued)

(52) U.S. Cl.
CPC .......... *A23L 3/3418* (2013.01); *A23B 7/0053* (2013.01); *A23B 7/148* (2013.01); *A23B 9/025* (2013.01); *A23B 9/20* (2013.01); *A23L 3/003* (2013.01); *A23L 3/165* (2013.01); *A23L 3/185* (2013.01); *A23L 25/20* (2016.08); *A23V 2002/00* (2013.01)

(58) Field of Classification Search
None
See application file for complete search history.

(56) References Cited

U.S. PATENT DOCUMENTS 255,965 A    4/1882  Fleury et al.
1,603,189 A  10/1926 Bruning
(Continued)

FOREIGN PATENT DOCUMENTS

CN  1215343 A   4/1999
DE  3310718     9/1984
(Continued)

OTHER PUBLICATIONS

Decagon. Fundamentals of Water Activity. 2012. pp. 1012.*
(Continued)

*Primary Examiner* — Stephanie A Cox
(74) *Attorney, Agent, or Firm* — Westman, Champlin & Koehler, P.A.

(57) ABSTRACT

A method of and a system for surface pasteurizing or sterilizing low-moisture particulate foods, such as nuts, oats, and spices, is disclosed wherein the foods are pre-heated, pasteurized or sterilized in a gas, optionally dried, and cooled. The gas pasteurizing or sterilizing the foods contains water vapor and one or more further gasses, preferably air.

20 Claims, 1 Drawing Sheet

Related U.S. Application Data is a continuation of application No. 13/474,748, filed on May 18, 2012, now abandoned.

(51) Int. Cl.
| | | |
|---|---|---|
| *A23L 3/16* | (2006.01) | |
| *A23B 7/005* | (2006.01) | |
| *A23B 7/148* | (2006.01) | |
| *A23L 3/00* | (2006.01) | |
| *A23B 9/20* | (2006.01) | |
| *A23L 25/00* | (2016.01) | |
| *A23L 3/18* | (2006.01) | |

(56) References Cited

U.S. PATENT DOCUMENTS

| | | | |
|---|---|---|---|
| 1,782,522 | A | 11/1930 | Tyler |
| 2,129,673 | A | 11/1936 | Burns |
| 3,585,049 | A | 6/1971 | Galle |
| 3,897,210 | A | 7/1975 | Gruber |
| 4,059,919 | A | 11/1977 | Green |
| 4,255,459 | A | 3/1981 | Glen |
| RE31,513 | E | 1/1984 | Glen |
| 4,903,414 | A | 2/1990 | White |
| 5,344,609 | A | 9/1994 | Long |
| 6,350,409 | B1 * | 2/2002 | Alness .............. A01C 1/08 34/168 |
| 8,956,675 | B2 | 2/2015 | van der Meer et al. |
| 2005/0112255 | A1 | 5/2005 | Tottenham |
| 2006/0040029 | A1 | 2/2006 | Gunawardena |
| 2006/0127553 | A1 | 6/2006 | van der Meer et al. |
| 2010/0136192 | A1 | 6/2010 | Perren |
| 2010/0173060 | A1 | 7/2010 | Perren |
| 2015/0024101 | A1 | 1/2015 | De Koomen |

FOREIGN PATENT DOCUMENTS

| | | |
|---|---|---|
| DE | 4337823 | 5/1995 |
| DE | 10203190 | 8/2003 |
| DE | 202008011577 U1 | 10/2008 |
| EP | 1754413 | 2/2007 |
| EP | 2849570 B1 | 3/2015 |
| JP | 2000024091 A | 1/2000 |
| JP | 2000135273 A | 5/2000 |
| JP | 2002112749 A | 4/2002 |
| JP | 200817828 A | 8/2009 |
| WO | 9738734 | 10/1997 |
| WO | 2004066751 A1 | 8/2004 |
| WO | 2009003545 | 1/2009 |
| WO | 2013171336 A1 | 11/2013 |

OTHER PUBLICATIONS

Vapor Pressure. Purdue, pp. 1-4. May 5, 2001. https://web.archive.org/web/20010505064108/https://www.chem.purdue.edu/gchelp/liquids/vpress.html.*
Fuchs, John. "Drying—The Effect of Temperature on Relative Humidity", Cleaning Technologies Group, May 2, 2013. [Retrieved on Sep. 16, 2018], Retrieved from the Internet: URL <https://techblog.ctgclean.com/2013/05/drying-the-effect-of-temperature-on-relative-humidity/>. (Year: 2013).*
International Preliminary Report on Patentability and International Search Report for corresponding foreign application PCT/EP2013/060277, filed May 17, 2013.
Communication dated Jan. 28, 2013 for corresponding EP 12184020.1-1221.
M. Nellist et al.: "Heated-Air Grain Drying"; The British Library; Marcel Dekker, 1995; pp. 609-659.
Notice of Reasons for Rejection from the Japanese Patent Office for Japanese patent application No. 2015-512082, dated Feb. 6, 2017.
Chinese Office Action dated Oct. 16, 2017 for corresponding Chinese Application No. 201380025860.4.
Communication of Notice of Opposition dated Jul. 5, 2017 for corresponding European Application No. 13789592.6.
Second Chinese Office Action for Chinese application No. 201380025860.4, dated Jan. 20, 2017, 17 pages.
European Search Report dated Oct. 11, 2018 for corresponding European Patent Application No. 18182771.8.
Decision of Rejection dated Sep. 14, 2018 for corresponding Japanese Patent Application No. 2015-512082, filed Nov. 14, 2014.
Canadian Office Action from the Canadian Intellectual Property Office for Canadian patent application No. 2,873,277, dated Apr. 24, 2019.
Japanese Office Action for corresponding Japanese Patent Application No. 2019-004339, dated Jan. 6, 2020.
Pre-Appeal Report for corresponding Japanese Patent Application No. 2015-512082, drafted Apr. 10, 2019.
Communication pursuant to Article 94(3) EPC for corresponding European Patent Application No. 18182771.8, dated Jul. 26, 2019.
A First Examination Report for corresponding Indian Patent Application No. 8570/CHENNP/2014, dated Aug. 28, 2019.
Canadian Office Action for corresponding Canadian Patent Application No. 2,873,277, dated Jan. 24, 2020.
Brazilian Office Action for corresponding Brazilian Patent Application No. 112014029191-8, filed May 17, 2013.

* cited by examiner

METHOD OF AND SYSTEM FOR SURFACE PASTEURIZATION OR STERILIZATION OF LOW-MOISTURE PARTICULATE FOODS

CROSS-REFERENCE TO RELATED APPLICATION

This application is a continuation under 35 USC 120 and claims the benefit of International Application PCT/EP2013/060277 filed May 17, 2013 and published as WO2013/171336 A1 in English, which claims the benefit of U.S. application Ser. No. 13/474,478 filed May 18, 2012, all of which are incorporated herein in their entirety.

BACKGROUND

The discussion below is merely provided for general background information and is not intended to be used as an aid in determining the scope of the claimed subject matter.

The invention relates to a method of surface pasteurizing, preferably by at least a 5 log reduction of pathogenic microorganisms, or sterilizing low-moisture particulate foods, such as nuts, seeds, grains, and spices, wherein the foods are pre-heated, pasteurized or sterilized in a gas, optionally dried, and cooled. The invention further relates to a system for surface pasteurization or sterilization of low-moisture particulate foods.

Agricultural foods are often naturally contaminated with microorganisms, harmless and pathogenic. In most cases, these products are processed to preserve and increase shelf stability. Common preservation techniques include heat pasteurization or even sterilization, irradiation and disinfestation with gaseous substances. The two latter techniques are rarely used nowadays due to legal restrictions as well as safety and nutritional concerns.

Low-moisture foods tend to be susceptible to quality degradation during pasteurization and sterilization. The moisture content of low-moisture foods ideally should not increase appreciably during pasteurization or sterilization. Almonds for instance tend to lose their brown skins if treated in a humid atmosphere, impairing quality. Conventional steam pasteurization and sterilization systems also tend to alter flavor and generate a cooked or boiled note in nuts.

With conventional pasteurization systems the application of steam at normal pressure and temperature (i.e. 1 bar and 100° C.) is used. Under these conditions the inactivation of salmonella will typically be 2.0-3.8 log after 35 seconds. By increasing duration up to 65 seconds, the log reduction increases to 4.0-5.7. However, moisture uptake will also increase significantly, thus treatment duration is preferably limited to 35 seconds or less.

The application of steam provides effective heat inactivation because, first, the heat capacity of water vapor (steam) is very high and even exceeds the heat capacity of water at the same temperature. Second, if the surface temperature is below the condensation temperature of the steam, water vapor condenses on the product surface and penetrates in cavities and crevices.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is to provide an improved method of and system for surface pasteurization or sterilization of low-moisture particulate foods.

A method according to an aspect of the present invention is characterized as defined in claim 1. In an embodiment, the relative humidity (RH) of the gas pasteurizing or sterilizing the foods is in excess of 60%, preferably in a range from 60 to 99%, preferably in a range from 80 to 98%, preferably in a range from 70 to 97%.

It was found that, compared to steam, humid air is similarly effective in pasteurization and sterilization and yet has an advantage over steam in that humid air does not require a reduction of operating pressure to reach an acceptable temperature, i.e. a water vapor temperature that is sufficiently low not to negatively affect the foods beyond an acceptable level. In general, the present invention provides an additional parameter, RH, to adjust and/or control the pasteurization or sterilization process.

In an embodiment, the foods are pre-heated to a temperature higher than the condensation temperature of the water vapor in the gas, preferably to a temperature in a range from 1 to 20° C., preferably 2 to 10° C. above the condensation temperature of the water vapor in the gas.

It was found that condensation on the surface of the foods is thus avoided or substantially avoided and that, despite this avoidance, pasteurization or sterilization is still effective, even though inactivation of microorganisms is, to date, generally attributed to latent heat generated at the surface of the foods during condensation. Absorption of water from the pasteurizing or sterilizing gas into the foods effectively constitutes a phase transition (from gas to liquid) and generates latent heat sufficient for inactivation.

Further, as condensation is relatively limited or even avoided, in principle no or significantly less drying of the nuts after pasteurization or sterilization is required, saving or reducing equipment, time and/or energy.

In an embodiment, the foods are pre-heated by means of a gas having a relative humidity in a range from 5 to 70% if pre-heating is followed by pasteurization and in a range from 5 to 90% if pre-heating is followed by sterilization. In an embodiment, to compensate for the increase in temperature of the foods that results from (pre-)heating, the relative humidity of the pre-heating gas is gradually increased during pre-heating.

Thus, desorption of water from the foods during pre-heating is reduced, preferably to less than 0.5%, and less (foreign) water needs to be absorbed during pasteurization or sterilization to compensate for such desorption. As an example, in nuts having a water content of 6.0%, during pre-heating in humid air the water content is reduced e.g. to 5.8% and little compensation is required. Thus, as desorption and subsequent absorption can be kept limited, the effects of these phenomena on the foods will be similarly limited.

In a further embodiment, during pasteurization or sterilization, the gas is at atmospheric pressure ±20%, i.e. in a range from 0.8 to 1.2 bar, preferably ±10%, i.e. in a range from 0.9 to 1.1 bar.

The method allows operation at or near atmospheric pressure and thus does not require a vacuum pump for the pasteurization vessel, providing substantial savings in equipment and operating costs.

In another embodiment, the difference in water activity (ΔAw) of the foods and the gas pasteurising or sterilising the foods is in a range from 0.01 to 0.25, preferably in a range from 0.05 to 0.20.

In yet another embodiment, at least the steps of pre-heating the foods and pasteurizing or sterilizing the foods, and preferably also the steps of cooling and/or drying, are carried out in the same vessel or column or on the same conveyor.

It is preferred that, during pasteurization or sterilization, the surface of the foods remains substantially free of condensate.

To further reduce effects on the foods, the duration of pasteurization or sterilization is in a range from 1 to 10 minutes, preferably in a range from 3 to 7 minutes.

It is generally preferred that pasteurization is carried out at a temperature in a range from 70 to 90° C.

The invention further relates to a system for pasteurizing or sterilizing low-moisture foods, such as nuts, seeds, grains, and spices, comprising at least one vessel, column or conveyor for pasteurizing or sterilizing the foods in a gas and a controller for operating the system, and means, such as an injector, humidifier and/or heater, arranged to set the relative humidity (RH) of the gas for pasteurizing or sterilizing the foods to a value in excess of 60%, preferably in a range from 60 to 99%, preferably in a range from 80 to 98%, preferably in a range from 70 to 97%.

In an embodiment, the controller is arranged to pre-heat the foods to a temperature of 5° C., preferably 2° C., below the condensation temperature of the water vapor in the gas, or higher, preferably to a temperature higher than the condensation temperature of the water vapor in the gas, preferably to a temperature in a range from 1 to 20° C., preferably 2 to 10° C. above the condensation temperature of the water vapor in the gas.

In a further embodiment, the humidifier and/or heater comprises an air intake.

In yet another embodiment, the vessel is an atmospheric vessel, i.e. the system comprises no vacuum pump to reduce the pressure in the vessel, saving equipment and operation costs.

In a further embodiment, the system comprises two or more parallel vessels for pasteurizing or sterilizing the foods in a gas and a controller for operating the system, at least two of the vessels having a capacity of less than 1000 kg, preferably less than 750 kg.

It was found that relatively small vessels facilitate pre-heating and pasteurizing or sterilizing in one and the same vessel. Efficiency is enhanced when the vessels are operated out of phase, e.g. in case of three vessels one is at the pasteurizing or sterilizing stage, one at the pre-heating stage, and one at the emptying and filling stage. Further, multiple vessels provide a degree of redundancy.

Within the framework of the present invention, the term "condensation temperature", in case of air also referred to as dew point, is defined as the temperature where the water vapor in a volume of humid gas at a given pressure will condense into liquid water. "Low-moisture foods" typically have a water content of 9 wt % or less.

BRIEF DESCRIPTION OF THE DRAWINGS

Aspects of the invention will now be explained in more detail with reference to the figures, which schematically show two embodiments.

DETAILED DESCRIPTION OF THE ILLUSTRATIVE EMBODIMENT

Figure 1:
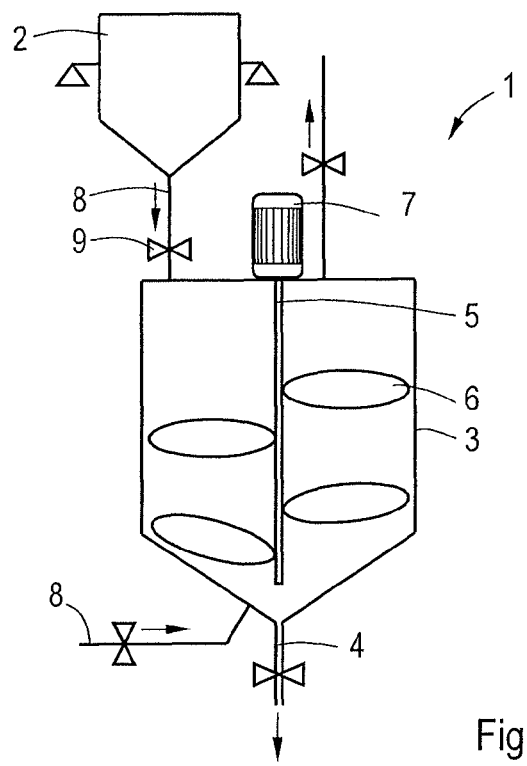
FIG. 1 is a flow diagram of a first embodiment of a system for pasteurization.

FIG. 1 shows a system 1 for pasteurization and sterilization of low-moisture foods, such as nuts, seeds, cocoa, grains, flour, oats, herbs, dried vegetables or fruit, and tobacco. The system comprises a means, known in itself (and not shown), for pre-heating the foods to a pre-selected temperature, a weighing hopper 2 having a capacity equal to or in excess of one batch, an atmospheric pasteurization vessel 3, a product outlet 4, and means for cooling the foods leaving the outlet 4.

In this example, the pasteurisation vessel 3 has a capacity of 1500 kg and is double-walled, i.e. the contents of the vessel 3 can be maintained at a pre-selected and substantially constant temperature by feeding a heating medium, such as steam, water or oil, to the space defined by the walls. The vessel 3 is provided with one or more stirring elements 5, e.g. a helical mixer, mounted on a central shaft 6 driven by an electric motor 7.

The system further comprises generally known conduits 8 and valves 9 operatively connecting the equipment 2-4 and a controller for operating the system. One of the conduits 8 forms an injector for hot and humid air at or near the bottom of the vessel 3.

During operation, a batch of 1500 kg of e.g. almonds or cocoa beans is pre-heated in a suitable device and by means of air having a temperature of 95° C. and a relative humidity (RH) gradually increasing from 5% at the beginning of pre-heating to 70% at the end of pre-heating. The pre-heated foods are conveyed to the hopper 2, weighed and from there fed to the pasteurization vessel 3. In the vessel 3, the foods, now at 82° C., are gently stirred and humid pasteurizing air having a temperature of 84° C., an RH of 90%, and a dew point of 81° C. (i.e., ΔT of the foods and the dew point is 1° C.) is fed to the bottom of the vessel 3 at a suitable flow rate. During pasteurization, no appreciable condensation of water occurred on the surface of the foods. After 5 minutes, a 5 log reduction of pathogenic microorganisms had been achieved and the vessel 3 was emptied and ready for receiving the next batch. Since no condensation occurred, the foods did not require drying. Finally, the foods were cooled and packaged.

In this example, the system was operated slightly above atmospheric pressure, e.g. at 1.1 bar, to maintain a constant flow of humid air through the vessel 3.

Figure 2:
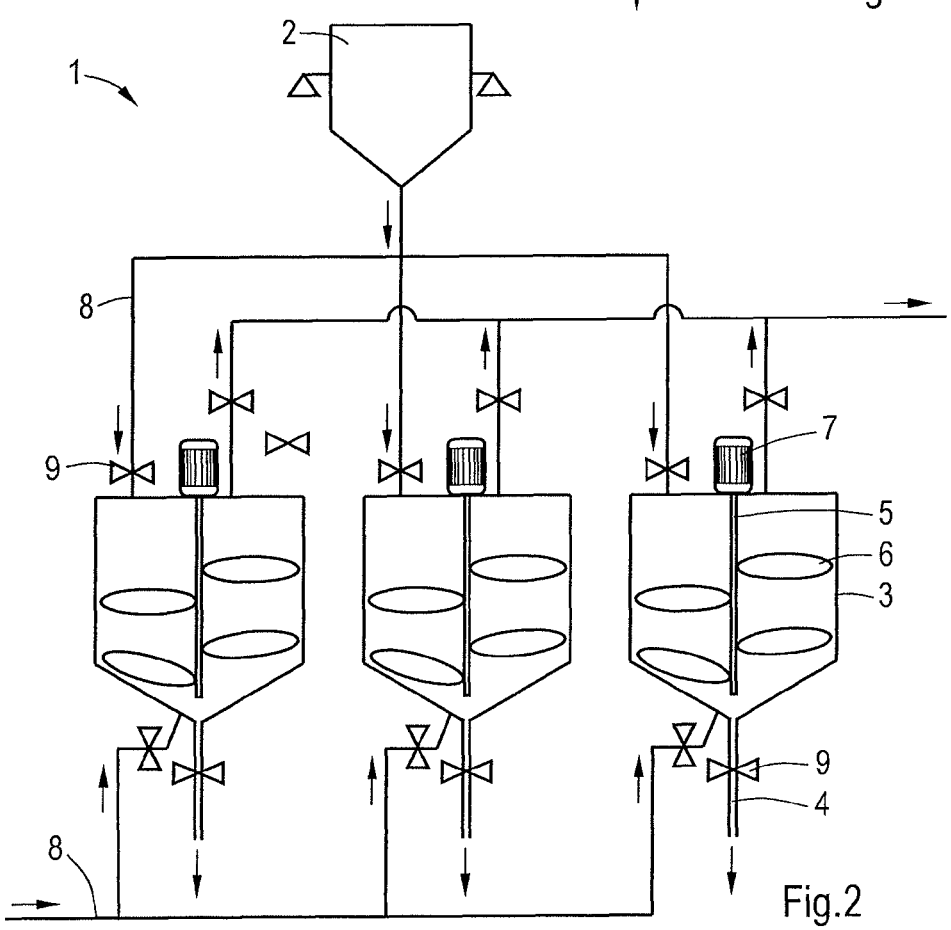
FIG. 2 is a flow diagram of a second embodiment of a system for pasteurization comprising a plurality of smaller vessels.

FIG. 2 shows a system comprising three parallel vessels 3 fed from a common hopper 2 and having a capacity of 700 kg each. Otherwise, the vessels 3 are the same as the one shown in FIG. 1. These relatively small vessels facilitate pre-heating and pasteurizing or sterilizing in one and the same vessel and enable in tandem and out of phase operation, e.g. one is at the pasteurizing or sterilizing stage, one at the pre-heating stage, and one at the emptying and filling stage.

The invention is not restricted to the above-described embodiments, which can be varied in a number of ways within the scope of the claims.

What is claimed is:
1. A method of surface pasteurizing or sterilizing low-moisture particulate foods, comprising:

pre-heating the foods from a lower temperature to a pasteurization temperature over time with a gas comprising water vapor and one or more further gasses;

pasteurizing or sterilizing the foods with the gas at the pasteurization temperature, and wherein, during the pasteurizing or sterilizing, the foods are at the pasteurization temperature which is higher than the condensation temperature of the water vapor in the gas wherein a relative humidity of the gas is changed as the temperature of the food is raised; and cooling the foods.

2. The method of claim 1 wherein the one or more further gasses comprises air.

3. The method according to claim 1, wherein the relative humidity (RH) of the gas pasteurizing or sterilizing the foods is in excess of 60%.

4. The method according to claim 1, wherein the relative humidity (RH) of the gas pasteurizing or sterilizing the foods is in a range from 60 to 99%.

5. The method according to claim 1, wherein the relative humidity (RH) of the gas pasteurizing or sterilizing the foods is in a range from 80 to 98%.

6. The method according to claim 1, wherein the relative humidity (RH) of the gas pasteurizing or sterilizing the foods is in a range from 70 to 97%.

7. The method according to claim 1, wherein the foods are pre-heated to a temperature in a range from 1 to 20° C. above the condensation temperature of the water vapor in the gas.

8. The method according to claim 7, wherein the foods are pre-heated to a temperature in a range from 2 to 10° C. above the condensation temperature of the water vapor in the gas pasteurizing or sterilizing the foods.

9. The method according to claim 1, wherein the foods are pre-heated by means of a gas having a relative humidity in a range from 5 to 70% if pre-heating is followed by pasteurization and in a range from 5 to 90% if pre-heating is followed by sterilization.

10. The method according to claim 9, wherein the relative humidity of the pre-heating gas is gradually increased during pre-heating.

11. The method according to claim 1, wherein, during pasteurization or sterilization, the gas is at atmospheric pressure ±20%.

12. The method according to claim 1, wherein the difference in water activity (ΔAw) of the foods and the gas pasteurising or sterilising the foods is in a range from 0.01 to 0.25.

13. The method according to claim 1, wherein the difference in water activity (ΔAw) of the foods and the gas pasteurising or sterilising the foods is in a range from 0.05 to 0.2.

14. The method according to claim 1, wherein at least pre-heating the foods and pasteurizing or sterilizing the foods are carried out in the same vessel or column or on the same conveyor.

15. The method according to claim 1, wherein, during pasteurization or sterilization, the surface of the foods remains substantially free of condensate.

16. The method according to claim 1, wherein the duration of pasteurization or sterilization is in a range from 1 to 10 minutes.

17. The method according to claim 1, wherein the total duration of pre-heating, pasteurization or sterilization, and cooling to below 40° C. is in a range from 3 to 30 minutes.

18. The method according to claim 1, wherein the pasteurizing or sterilizing occurs at a temperature in a range from 70 to 90° C.

19. A method of surface pasteurizing or sterilizing low-moisture particulate foods, comprising:

pre-heating the foods from a lower temperature to a pasteurization temperature over time with a gas comprising water vapor and one or more further gasses;

pasteurizing or sterilizing the foods with the gas at the pasteurization temperature, wherein, during the pasteurizing or sterilizing, the foods are at a temperature higher than the condensation temperature of the water vapor in the gas, wherein a relative humidity (RH) of the gas pasteurizing or sterilizing the foods is in excess of 60%, and wherein the difference in water activity (ΔAw) of the foods and the gas pasteurising or sterilising the foods is in a range from 0.01 to 0.25, wherein the relative humidity of the gas is changed as the temperature of the foods is raised; and cooling the foods.

20. The method according to claim 19, wherein the pasteurizing or sterilizing occurs at a temperature in a range from 70 to 90° C.

* * * * *